United States Patent
Wang et al.

(10) Patent No.: US 10,434,501 B2
(45) Date of Patent: Oct. 8, 2019

(54) SUPPORTED SOLID PHASE CATALYST, AND PREPARATION METHOD AND USE THEREOF

(71) Applicant: North China Electric Power University Baoding, Baoding (CN)

(72) Inventors: Lidong Wang, Baoding (CN); Juan Wang, Baoding (CN); Tieyue Qi, Baoding (CN)

(73) Assignee: North China Electric Power University Baoding, Baoding (CN)

(*) Notice: Subject to any disclaimer, the term of this patent is extended or adjusted under 35 U.S.C. 154(b) by 101 days.

(21) Appl. No.: 15/548,178

(22) PCT Filed: Aug. 12, 2015

(86) PCT No.: PCT/CN2015/000585
§ 371 (c)(1),
(2) Date: Aug. 2, 2017

(87) PCT Pub. No.: WO2017/024420
PCT Pub. Date: Feb. 16, 2017

(65) Prior Publication Data
US 2018/0029020 A1    Feb. 1, 2018

(51) Int. Cl.
*B01J 27/25*        (2006.01)
*B01D 53/50*        (2006.01)
(Continued)

(52) U.S. Cl.
CPC .............. *B01J 27/25* (2013.01); *B01D 53/50* (2013.01); *B01D 53/78* (2013.01); *B01D 53/86* (2013.01);
(Continued)

(58) Field of Classification Search
CPC .... B01D 53/8609; B01D 53/96; B01D 53/78; B01D 53/86; B01D 53/50;
(Continued)

(56) References Cited

U.S. PATENT DOCUMENTS

| | | | |
|---|---|---|---|
| 4,255,400 A | 3/1981 | Hasebe | |
| 5,547,648 A * | 8/1996 | Buchanan | B01D 53/04 423/210 |
| 2015/0126362 A1* | 5/2015 | Despen | B01J 20/3078 502/419 |

FOREIGN PATENT DOCUMENTS

| | | | |
|---|---|---|---|
| CN | 101618331 A | | 1/2010 |
| CN | 103285875 A * | | 9/2013 |

(Continued)

*Primary Examiner* — Amber R Orlando
*Assistant Examiner* — Syed T Iqbal
(74) *Attorney, Agent, or Firm* — Fox Rothschild LLP

(57) ABSTRACT

The present invention belongs to the flue gas desulfuration field. Specifically, the present invention relates to a supported solid-phase catalyst for oxidizing the by-product magnesium sulfite in a magnesium desulfuration process, and to preparation method and use thereof. The catalyst uses an activated carbon particle as a support, and cobalt nitrate, manganese nitrate, copper nitrate and ferrous nitrate as catalytically active components. The preparation method is as follows: mixing the pre-treated activated carbon support with the catalytically active components, followed by oscillating, standing under microwave irradiation, filtrating, drying, baking, so as to obtain the supported solid-phase catalyst. Raw materials of the present invention are inexpensive and easily available; the preparation process is simple; the catalyst has prominent catalytic effect and can be widely used in the magnesium desulfuration process in medium-sized and small-sized boilers of 75t or more to improve the recovery rate of the desulfuration by-product and reduce energy consumption of the oxidation system; the catalyst has a low amount of catalytically active components and causes low residue in the solution and hence no secondary pollution problem, and has a high generalization value.

6 Claims, 2 Drawing Sheets

(51) Int. Cl.
| | |
|---|---|
| B01D 53/78 | (2006.01) |
| B01D 53/86 | (2006.01) |
| B01D 53/96 | (2006.01) |
| B01J 37/06 | (2006.01) |
| B01J 37/08 | (2006.01) |
| B01J 37/34 | (2006.01) |
| B01J 23/889 | (2006.01) |
| B01J 23/00 | (2006.01) |
| B01J 35/02 | (2006.01) |
| B01J 35/10 | (2006.01) |
| B01J 37/02 | (2006.01) |
| B01J 21/18 | (2006.01) |

(52) U.S. Cl.
CPC ......... *B01D 53/8609* (2013.01); *B01D 53/96* (2013.01); *B01J 23/002* (2013.01); *B01J 23/8892* (2013.01); *B01J 35/023* (2013.01); *B01J 35/1057* (2013.01); *B01J 35/1061* (2013.01); *B01J 35/1066* (2013.01); *B01J 37/0207* (2013.01); *B01J 37/06* (2013.01); *B01J 37/088* (2013.01); *B01J 37/346* (2013.01); *B01D 53/502* (2013.01); *B01D 2251/402* (2013.01); *B01D 2255/2073* (2013.01); *B01D 2255/20738* (2013.01); *B01D 2255/20746* (2013.01); *B01D 2255/20761* (2013.01); *B01J 21/18* (2013.01); *B01J 2523/00* (2013.01)

(58) Field of Classification Search
CPC ............ B01D 2251/402; B01D 53/502; B01D 2255/20761; B01D 2255/20746; B01D 2255/20738; B01D 2255/2073; B01J 27/25; B01J 37/088; B01J 37/0207; B01J 35/1066; B01J 35/1061; B01J 35/1057; B01J 35/023; B01J 23/002; B01J 23/8892; B01J 37/346; B01J 37/06; B01J 2523/00; B01J 21/18
See application file for complete search history.

(56) References Cited

FOREIGN PATENT DOCUMENTS

| CN | 103977832 A | 8/2014 |
|---|---|---|
| JP | S5148795 A | 4/1976 |

* cited by examiner

SUPPORTED SOLID PHASE CATALYST, AND PREPARATION METHOD AND USE THEREOF

TECHNICAL FIELD

The present invention belongs to the field of flue gas desulfuration. Specifically, the present invention relates to a supported solid-phase catalyst for oxidizing the by-product magnesium sulfite in a magnesium desulfuration process, and to preparation method and use thereof.

BACKGROUND

The magnesium desulfuration process is a flue gas treatment process commonly used in the medium-sized and small-sized industrial boilers in China, and the rationale of the process is that using an aqueous solution of magnesium oxide as an absorbing agent, thereby sulfur dioxide in a flue gas is absorbed to produce magnesium sulfite, which is oxidized to produce a magnesium sulfate solution. This process is featured by high desulfuration efficiency, low investment, low land occupation, stable operation and so on, and hence develops very fast in China recently.

In practical operation, since the oxidation reaction rate of magnesium sulfite (the by-product of the magnesium desulfuration process) is relatively low, and insufficient oxidation of magnesium sulfite tends to bring about issues of system scaling, blocking, low product quality, secondary pollution of effluents and so on, causing a relatively high investment and high energy consumption of the recovery process of desulfuration by-product. At the present time, the above problem is solved by adding transitional metal catalyst, and this can significantly improve the oxidation capacity of the system without changing the blow rate of the oxidizing gas and hence has good application prospect. However, since the catalyst is added in a solution form into the desulfuration slurry, operation cost of the application process is high; meanwhile, the catalyst being difficult to be recovered will inevitably cause secondary pollution of heavy metal(s) in the desulfuration by-product and effluents. Therefore, the application and popularization of the catalyst is greatly limited.

SUMMARY OF THE INVENTION

An object of the present invention is to provide a supported solid-phase catalyst, preparation method and use thereof.

Specifically, a supported solid-phase catalyst, characterized in that the catalyst uses an activated carbon particle as a support, and cobalt nitrate, manganese nitrate, copper nitrate and ferrous nitrate as catalytically active components, and the molar ratio of cobalt nitrate, manganese nitrate, copper nitrate and ferrous nitrate is (2-7):(1-4):(1-4):(1-4).

The total amount of metal ions in the catalytically active components is 0.01-0.2 percent by mass of the catalyst.

The activated carbon particle is one or more particles of coal-based spheral activated carbon, coconut shell-based activated carbon, nutshell-based activated carbon, wood-based activated carbon, bamboo-based activated carbon and coal-based columnar activated carbon.

The activated carbon particle has a particle size in the range of 0.1 mm to 10 mm, and has an average pore size in the range of 1 nm to 100 nm. The activated carbon particle has good stability and mechanical strength and is easy to achieve catalyst recovery.

The method for preparing the catalyst described above has the steps of:
(1) heating and refluxing the activated carbon particle in a nitric acid solution, then going through ultrasonical oscillation, filtration, washing to neutral and drying, so as to obtain a pre-treated activated carbon support;
(2) mixing the obtained activated carbon support with the catalytically active components, followed by oscillating, standing under microwave irradiation, filtrating, drying, baking, so as to obtain the supported solid-phase catalyst.

In step (2), the specific operations are: immersing the obtained activated carbon support in a mixed solution of cobalt nitrate, manganese nitrate, copper nitrate and ferrous nitrate, dynamically immersing at 2000 r/min in a thermostatic oscillator for 5 h, standing for 12 h under microwave irradiation, filtrating, drying at 120° C. for 6 h, one-time calcining at 250° C. for 2 h, baking at 400° C. for 3 h, so as to obtain the supported solid-phase catalyst.

Application of the above mentioned catalyst is to add the catalyst into the by-product oxidation system of the magnesium desulfuration process and catalyze the oxidation of magnesium sulfite.

In the by-product oxidation system of the magnesium desulfuration process, concentration of magnesium sulfite is in the range of 10 g/L to 160 g/L.

Compared with the prior art, the present invention has beneficial effects of simple preparation process and easy operation, and also has the following advantages:
(1) the activated carbon, a raw material of the supported solid-phase catalyst of the present invention, is inexpensive and easily available and the preparation process is simple.
(2) the supported solid-phase catalyst of the present invention has prominent catalytic effect, oxidation rate of magnesium sulfite is 4 times or more of non-catalytic condition, the catalyst solves the problem of scaling and blocking caused by extra high concentration of magnesium sulfite in the desulfuration system, and the catalyst can be effectively used in the optimization of the oxidation system of the magnesium desulfuration process.
(3) the supported solid-phase catalyst of the present invention uses only a small amount of the active components, has a high efficiency and a low residue in the solution and can effectively avoid the secondary pollution issue, the catalyst is easy to be recovered and has a high repeating utilization rate, greatly reduces the cost of operation, and is suitable to the magnesium desulfuration process in medium-sized and small-sized boilers, and has popularization value.

EMBODIMENTS

The present invention relates to a supported solid-phase catalyst, preparation method and use thereof, which are described as below in detail by way of exemplified examples.

Activated carbon support used in the following examples was pre-treated as follows: activated carbon was heated and refluxed in a concentrated nitric acid of 50% concentration for 1 h, then ultrasonically oscillated at 40 Hz for 40 min, stood, filtrated, washed to neutral, dried at 120° C. for 5 h, so as to obtain the activated support for use.

Method for determining the reaction rate of magnesium sulfite under catalytic condition was as follows: an amount of the catalyst was added into the oxidation reaction system of magnesium sulfite, the reaction conditions were: reaction solution volume: 200 ml, reaction temperature: 45° C., initial concentration of magnesium sulfite: 20 g/L, pH: 8.0, forced air flow rate: 60 L/h. The concentration of sulfate ion in the reactor was tested at intervals, production amount of sulfate ion in a unit time representing the oxidation reaction rate of magnesium sulfite; the reaction rate of magnesium sulfite under catalytic condition was thus obtained.

1. Preparation and Application of Catalysts Having Different Types of Activated Carbon Particles

Example 1

Figure 1:
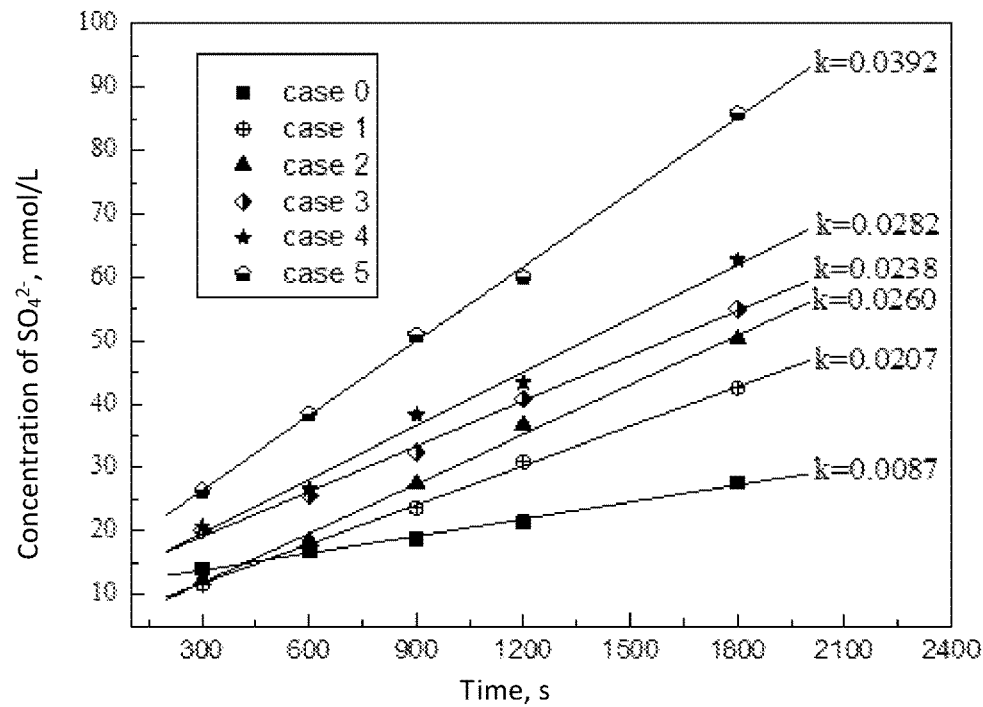
FIG. 1 is a graph of the catalytic reaction effects of accelerating oxidation of magnesium sulfite using supported solid-phase catalyst having different types of activated carbon.

In an oxidation reaction system of magnesium sulfite, no additive was added, the reaction solution volume was 200 ml, the reaction temperature was 45° C., the initial concentration of magnesium sulfite was 20 g/L, pH was 8.0, the forced air flow rate was 60 L/h, under such conditions, the reaction rate was 0.0087 mmol/(L·s), as shown by case 0 in FIG. 1.

Example 2

After pre-treatment, 10.000 g of coal-based columnar activated carbon (CYC) having a diameter of 0.5 mm was added into a mixed solution of 1.4797 g of $Co(NO_3)_2 \cdot 6H_2O$, 0.4932 g of $Mn(NO_3)_2 \cdot 4H_2O$, 0.6840 g of $Fe(NO_3)_2 \cdot 9H_2O$, and 0.4840 g of $Cu(NO_3)_2 \cdot 3H_2O$, then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0207 mmol/(L·s), as shown by case 1 in FIG. 1, and increased by 3.5 times compared with the non-catalytic condition.

Example 3

After pre-treatment, 10.000 g of wood-based activated carbon (WC) having a diameter of 2-4 mm was added into a mixed solution of 1.4797 g of $Co(NO_3)_2 \cdot 6H_2O$, 0.4932 g of $Mn(NO_3)_2 \cdot 4H_2O$, 0.6840 g of $Fe(NO_3)_2 \cdot 9H_2O$, and 0.4840 g of $Cu(NO_3)_2 \cdot 3H_2O$, then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0260 mmol/(L·s), as shown by case 2 in FIG. 1, and increased by 2.2 times compared with the non-catalytic condition.

Example 4

After pre-treatment, 10.000 g of bamboo-based activated carbon (BC) having a diameter of 2-4 mm was added into a mixed solution of 1.4797 g of $Co(NO_3)_2 \cdot 6H_2O$, 0.4932 g of $Mn(NO_3)_2 \cdot 4H_2O$, 0.6840 g of $Fe(NO_3)_2 \cdot 9H_2O$, and 0.4840 g of $Cu(NO_3)_2 \cdot 3H_2O$, then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0238 mmol/(L·s), as shown by case 3 in FIG. 1, and increased by 1.73 times compared with the non-catalytic condition.

Example 5

After pre-treatment, 10.000 g of coconut shell-based activated carbon (CC) having a diameter of 2-4 mm was added into a mixed solution of 1.4797 g of $Co(NO_3)_2 \cdot 6H_2O$, 0.4932 g of $Mn(NO_3)_2 \cdot 4H_2O$, 0.6840 g of $Fe(NO_3)_2 \cdot 9H_2O$, and 0.4840 g of $Cu(NO_3)_2 \cdot 3H_2O$, then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0282 mmol/(L·s), as shown by case 4 in FIG. 1, and increased by 1.93 times compared with the non-catalytic condition.

Example 6

After pre-treatment, 10.000 g of nutshell-based activated carbon (FC) having a diameter of 2-4 mm was added into a mixed solution of 1.4797 g of $Co(NO_3)_2 \cdot 6H_2O$, 0.4932 g of $Mn(NO_3)_2 \cdot 4H_2O$, 0.6840 g of $Fe(NO_3)_2 \cdot 9H_2O$, and 0.4840 g of $Cu(NO_3)_2 \cdot 3H_2O$, then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst 1 g of the obtained catalyst was added into the oxidation reaction system of magnesium sulfite having a reaction solution volume of 200 ml. Here, the catalytic reaction rate was 0.0392 mmol/(L·s), as shown by case 5 in FIG. 1, and increased by 1.37 times compared with the non-catalytic condition.

2. Preparation and Application of Catalysts Having Different Molar Ratios of Catalytically Active Components Example 7

After pre-treatment, 10.000 g of nutshell-based activated carbon (FC) having a diameter of 2-4 mm was added into a mixed solution of 0.2910 g of $Co(NO_3)_2 \cdot 6H_2O$, 0.2510 g of $Mn(NO_3)_2 \cdot 4H_2O$, 0.3420 g of $Fe(NO_3)_2 \cdot 9H_2O$, and 0.2420 g of $Cu(NO_3)_2 \cdot 3H_2O$ (in a molar ratio of 1:1:1:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

Figure 2:
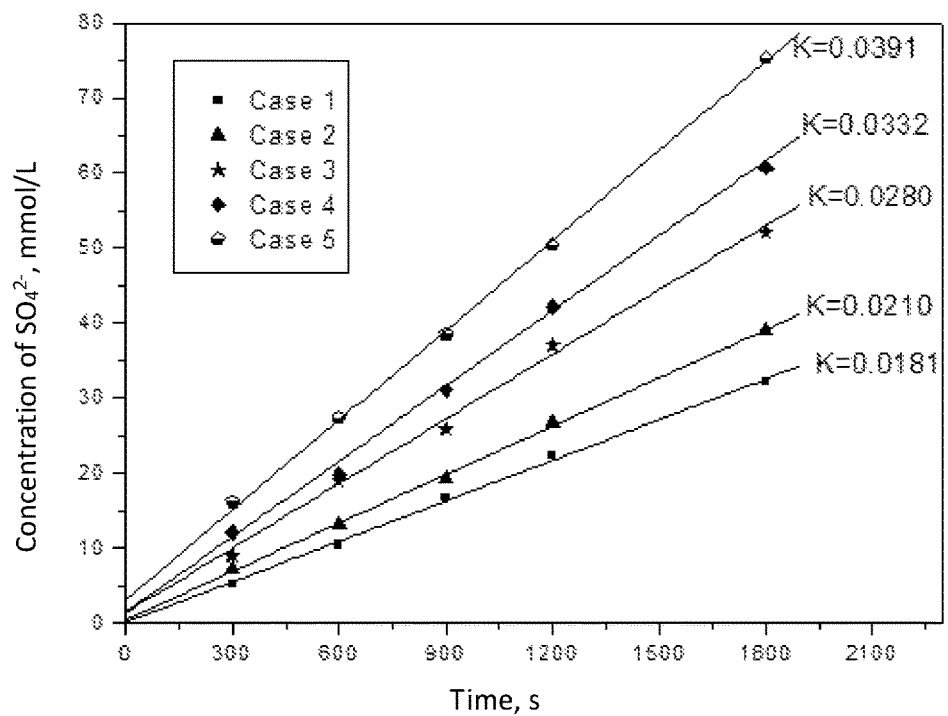
FIG. 2 is a graph of the catalytic reaction effects of accelerating oxidation of magnesium sulfite using supported solid-phase catalysts having different molar ratios of catalytically active components.

1 g of the obtained catalyst was added into the oxidation reaction system of magnesium sulfite having a reaction solution volume of 200 ml. Here, the catalytic reaction rate was 0.0181 mmol/(L·s), as shown by case 1 in FIG. 2, and increased by 2.1 times compared with the non-catalytic condition.

Example 8

After pre-treatment, 10.000 g of nutshell-based activated carbon (FC) having a diameter of 2-4 mm was added into a mixed solution of 0.873 g of $Co(NO_3)_2 \cdot 6H_2O$, 0.7530 g of $Mn(NO_3)_2 \cdot 4H_2O$, 0.6840 g of $Fe(NO_3)_2 \cdot 9H_2O$, and 0.4840 g of $Cu(NO_3)_2 \cdot 3H_2O$ (in a molar ratio of 3:3:2:2), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0210 mmol/(L·s), as shown by case 2 in FIG. 2, and increased by 2.4 times compared with the non-catalytic condition.

Example 9

After pre-treatment, 10.000 g of nutshell-based activated carbon (FC) having a diameter of 2-4 mm was added into a mixed solution of 1.1640 g of $Co(NO_3)_2 \cdot 6H_2O$, 0.5020 g of $Mn(NO_3)_2 \cdot 4H_2O$, 0.6840 g of $Fe(NO_3)_2 \cdot 9H_2O$, and 0.4840 g of $Cu(NO_3)_2 \cdot 3H_2O$ (in a molar ratio of 4:2:2:2), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0280 mmol/(L·s), as shown by case 3 in FIG. 2, and increased by 3.2 times compared with the non-catalytic condition.

Example 10

After pre-treatment, 10.000 g of nutshell-based activated carbon (FC) having a diameter of 2-4 mm was added into a mixed solution of 1.4550 g of $Co(NO_3)_2 \cdot 6H_2O$, 0.4932 g of $Mn(NO_3)_2 \cdot 4H_2O$, 0.6840 g of $Fe(NO_3)_2 \cdot 9H_2O$, and 0.4840 g of $Cu(NO_3)_2 \cdot 3H_2O$ (in a molar ratio of 5:2:2:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0332 mmol/(L·s), as shown by case 1 in FIG. 2, and increased by 3.8 times compared with the non-catalytic condition.

Example 11

After pre-treatment, 10.000 g of nutshell-based activated carbon (FC) having a diameter of 2-4 mm was added into a mixed solution of 2.0370 g of $Co(NO_3)_2 \cdot 6H_2O$, 0.2510 g of $Mn(NO_3)_2 \cdot 4H_2O$, 0.3420 g of $Fe(NO_3)_2 \cdot 9H_2O$, and 0.2420 g of $Cu(NO_3)_2 \cdot 3H_2O$ (in a molar ratio of 7:1:1:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0391 mmol/(L·s), as shown by case 1 in FIG. 2, and increased by 4.5 times compared with the non-catalytic condition.

Example 12

After pre-treatment, 10.000 g of nutshell-based activated carbon (FC) having a diameter of 2-4 mm was added into a mixed solution of 2.0370 g of $Co(NO_3)_2 \cdot 6H_2O$, 0.2510 g of $Mn(NO_3)_2 \cdot 4H_2O$, 0.3420 g of $Fe(NO_3)_2 \cdot 9H_2O$, and 0.2420 g of $Cu(NO_3)_2 \cdot 3H_2O$ (in a molar ratio of 7:1:1:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

Figure 3:
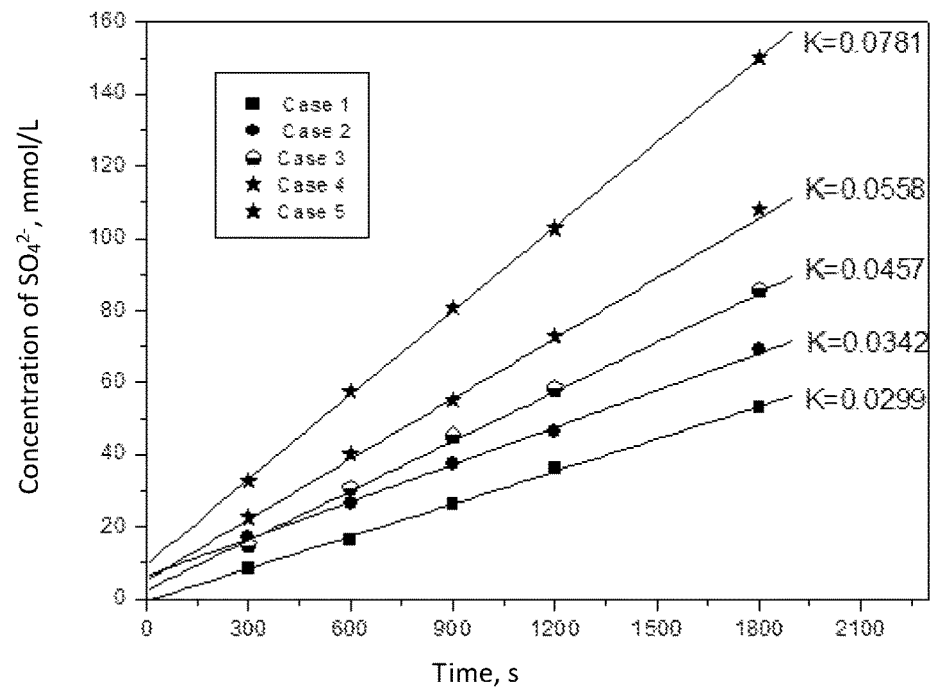
FIG. 3 is a graph of the catalytic reaction effects of accelerating oxidation of magnesium sulfite using different concentrations of the supported solid-phase catalyst.

0.5 g of the obtained catalyst was added into the oxidation reaction system of magnesium sulfite having a reaction solution volume of 200 ml. Here, the catalytic reaction rate was 0.0299 mmol/(L·s), as shown by case 1 in FIG. 3, and increased by 3.4 times compared with the non-catalytic condition.

Example 13

After pre-treatment, 10.000 g of nutshell-based activated carbon (FC) having a diameter of 2-4 mm was added into a mixed solution of 2.0370 g of $Co(NO_3)_2 \cdot 6H_2O$, 0.2510 g of $Mn(NO_3)_2 \cdot 4H_2O$, 0.3420 g of $Fe(NO_3)_2 \cdot 9H_2O$, and 0.2420 g of $Cu(NO_3)_2 \cdot 3H_2O$ (in a molar ratio of 7:1:1:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0342 mmol/(L·s), as shown by case 2 in FIG. 3, and increased by 3.9 times compared with the non-catalytic condition.

Example 14

After pre-treatment, 10.000 g of nutshell-based activated carbon (FC) having a diameter of 2-4 mm was added into a mixed solution of 2.0370 g of $Co(NO_3)_2 \cdot 6H_2O$, 0.2510 g of $Mn(NO_3)_2 \cdot 4H_2O$, 0.3420 g of $Fe(NO_3)_2 \cdot 9H_2O$, and 0.2420 g of $Cu(NO_3)_2 \cdot 3H_2O$ (in a molar ratio of 7:1:1:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

2 g of the obtained catalyst was added into the oxidation reaction system of magnesium sulfite having a reaction solution volume of 200 ml. Here, the catalytic reaction rate was 0.0457 mmol/(L·s), as shown by case 3 in FIG. 3, and increased by 5.3 times compared with the non-catalytic condition.

Example 15

After pre-treatment, 10.000 g of nutshell-based activated carbon (FC) having a diameter of 2-4 mm was added into a mixed solution of 2.0370 g of $Co(NO_3)_2 \cdot 6H_2O$, 0.2510 g of $Mn(NO_3)_2 \cdot 4H_2O$, 0.3420 g of $Fe(NO_3)_2 \cdot 9H_2O$, and 0.2420 g of $Cu(NO_3)_2 \cdot 3H_2O$ (in a molar ratio of 7:1:1:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

4 g of the obtained catalyst was added into the oxidation reaction system of magnesium sulfite having a reaction solution volume of 200 ml. Here, the catalytic reaction rate was 0.0558 mmol/(L·s), as shown by case 4 in FIG. 3, and increased by 6.4 times compared with the non-catalytic condition.

Example 16

After pre-treatment, 10.000 g of nutshell-based activated carbon (FC) having a diameter of 2-4 mm was added into a mixed solution of 2.0370 g of $Co(NO_3)_2 \cdot 6H_2O$, 0.2510 g of $Mn(NO_3)_2 \cdot 4H_2O$, 0.3420 g of $Fe(NO_3)_2 \cdot 9H_2O$, and 0.2420 g of $Cu(NO_3)_2 \cdot 3H_2O$ (in a molar ratio of 7:1:1:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

8 g of the obtained catalyst was added into the oxidation reaction system of magnesium sulfite having a reaction solution volume of 200 ml. Here, the catalytic reaction rate was 0.0781 mmol/(L·s), as shown by case 5 in FIG. 3, and increased by 9.0 times compared with the non-catalytic condition.

Example 17

After pre-treatment, 10.000 g of nutshell-based activated carbon (FC) having a diameter of 0.5-1 mm was added into a mixed solution of 2.0370 g of $Co(NO_3)_2 \cdot 6H_2O$, 0.2510 g of $Mn(NO_3)_2 \cdot 4H_2O$, 0.3420 g of $Fe(NO_3)_2 \cdot 9H_2O$, and 0.2420 g of $Cu(NO_3)_2 \cdot 3H_2O$ (in a molar ratio of 7:1:1:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

Figure 4:
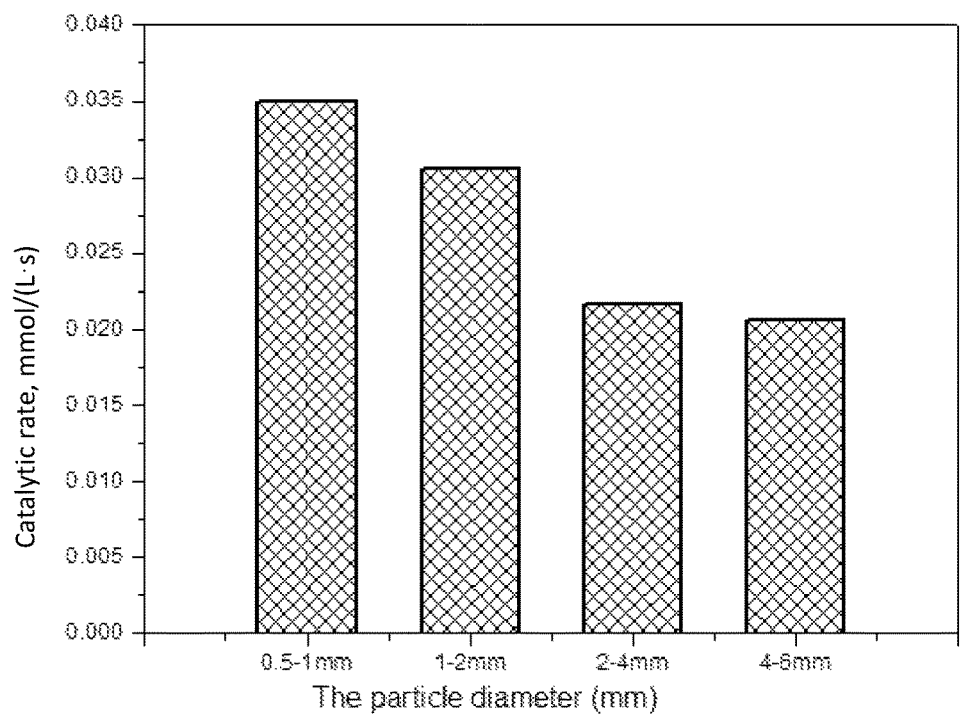
FIG. 4 is a graph of the catalytic reaction effects of accelerating oxidation of magnesium sulfite using supported solid-phase catalysts having different catalyst particle sizes.

1 g of the obtained catalyst was added into the oxidation reaction system of magnesium sulfite having a reaction solution volume of 200 ml. Here, the catalytic reaction rate was 0.0349 mmol/(L·s), as shown in FIG. 4, and increased by 3.9 times compared with the non-catalytic condition.

Example 18

After pre-treatment, 10.000 g of nutshell-based activated carbon (FC) having a diameter of 1-2 mm was added into a mixed solution of 2.0370 g of $Co(NO_3)_2 \cdot 6H_2O$, 0.2510 g of $Mn(NO_3)_2 \cdot 4H_2O$, 0.3420 g of $Fe(NO_3)_2 \cdot 9H_2O$, and 0.2420 g of $Cu(NO_3)_2 \cdot 3H_2O$ (in a molar ratio of 7:1:1:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0306 mmol/(L·s), as shown in FIG. 4, and increased by 3.5 times compared with the non-catalytic condition.

Example 19

After pre-treatment, 10.000 g of nutshell-based activated carbon (FC) having a diameter of 2-4 mm was added into a mixed solution of 2.0370 g of $Co(NO_3)_2 \cdot 6H_2O$, 0.2510 g of $Mn(NO_3)_2 \cdot 4H_2O$, 0.3420 g of $Fe(NO_3)_2 \cdot 9H_2O$, and 0.2420 g of $Cu(NO_3)_2 \cdot 3H_2O$ (in a molar ratio of 7:1:1:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0217 mmol/(L·s), as shown in FIG. 4, and increased by 2.5 times compared with the non-catalytic condition.

Example 20

After pre-treatment, 10.000 g of nutshell-based activated carbon (FC) having a diameter of 4-6 mm was added into a mixed solution of 2.0370 g of $Co(NO_3)_2 \cdot 6H_2O$, 0.2510 g of $Mn(NO_3)_2 \cdot 4H_2O$, 0.3420 g of $Fe(NO_3)_2 \cdot 9H_2O$, and 0.2420 g of $Cu(NO_3)_2 \cdot 3H_2O$ (in a molar ratio of 7:1:1:1), then went through dynamical immersion at 2000 r/min in a thermostatic oscillator for 5 h, standing for 12 h under microwave irradiation, filtration, drying at 120° C. for 6 h, one-time calcining at 250° C. for 2 h, baking at 400° C. for 3 h, so as to obtain the supported solid-phase catalyst.

1 g of the obtained catalyst was added into the oxidation reaction system of magnesium sulfite having a reaction solution volume of 200 ml. Here, the catalytic reaction rate was 0.0206 mmol/(L·s), as shown in FIG. 4, and increased by 2.4 times compared with the non-catalytic condition.

The invention claimed is:

1. A method for preparing a supported solid-phase catalyst using an activated carbon particle as the support, comprising:
   (1) heating and refluxing the activated carbon particle in a nitric acid solution, followed by ultrasonic oscillation, filtration, washing to neutral, and drying, to obtain a pre-treated activated carbon support; and
   (2) mixing the pre-treated activated carbon support with cobalt nitrate, manganese nitrate, copper nitrate and ferrous nitrate, followed by oscillating, standing under microwave irradiation, filtrating, drying, and baking, to obtain the supported solid-phase catalyst,
   wherein the molar ratio of cobalt nitrate, manganese nitrate, copper nitrate, and ferrous nitrate is (2-7):(1-4):(1-4):(1-4).

2. The method according to claim 1, wherein step (2) comprises:
   immersing the obtained activated carbon support in a mixed solution of cobalt nitrate, manganese nitrate, copper nitrate and ferrous nitrate,
   immersing at 2000 r/min in a thermostatic oscillator for 5 h, and
   standing for 12 h under microwave irradiation, filtrating, drying at 120° C. for 6 h, one-time calcining at 250° C. for 2 h, baking at 400° C. for 3 h, to obtain the supported solid-phase catalyst.

3. The method according to claim 2, wherein in the mixed solution, concentration of cobalt nitrate ranges from 0.001 mol/L to 0.102 mol/L, concentration of manganese nitrate ranges from 0.001 mol/L to 0.051 mol/L, concentration of copper nitrate ranges from 0.001 mol/L to 0.075 mol/L, and concentration of ferrous nitrate ranges from 0.001 mol/L to 0.045 mol/L.

4. The method according to claim 1, wherein the total amount of metal ions is 0.01-0.2 percent by mass of the catalyst.

5. The method according to claim 1, wherein the activated carbon particle is one or more of coal-based spheral activated carbon, coconut shell-based activated carbon, nutshell-based activated carbon, wood-based activated carbon, bamboo-based activated carbon and coal-based columnar activated carbon.

6. The method according to claim 1, wherein the activated carbon particle has a particle size in the range of 0.1 mm to 10 mm and an average pore size in the range of 1 nm to 100 nm.

* * * * *